May 12, 1942.   W. J. MILLER   2,282,372
APPARATUS FOR FEEDING CLAY TO MOLDS IN THE MANUFACTURE OF POTTERY WARE
Original Filed March 20, 1936   2 Sheets-Sheet 1
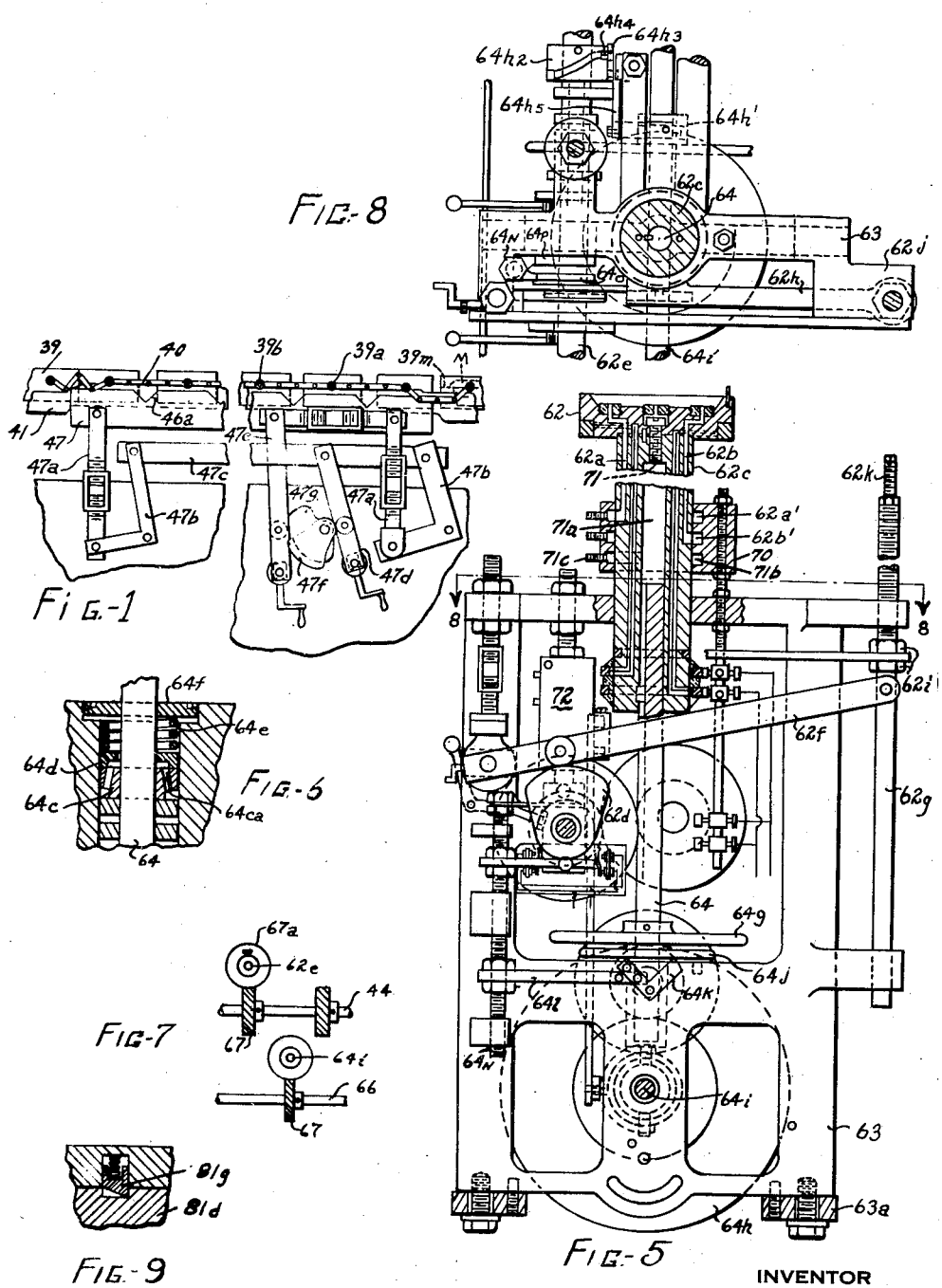
INVENTOR
William J. Miller
BY
ATTORNEY.

May 12, 1942. W. J. MILLER 2,282,372
APPARATUS FOR FEEDING CLAY TO MOLDS IN THE MANUFACTURE OF POTTERY WARE
Original Filed March 20, 1936 2 Sheets-Sheet 2

INVENTOR
WILLIAM J. MILLER
BY
ATTORNEY

Patented May 12, 1942

2,282,372

UNITED STATES PATENT OFFICE 2,282,372

APPARATUS FOR FEEDING CLAY TO MOLDS IN THE MANUFACTURE OF POTTERY WARE

William J. Miller, Swissvale, Pa.

Original application March 20, 1936, Serial No. 69,776. Divided and this application August 13, 1940, Serial No. 352,378. In Russia June 10, 1929

4 Claims. (Cl. 25—22).

This is a divisional application of my co-pending application Serial No. 69,776, filed March 20, 1936 which has become patent 2,243,880, and relates to a method and apparatus for feeding clay to molds in the manufacture of pottery ware.

As explained in my co-pending application mentioned, the molds in which the ware is formed and fabricated are disposed on open bottom trays which are mounted in series in an endless flexible conveyor. Said conveyor progresses the molds to a position where clay is automatically fed thereto by the novel means making up the subject matter of this application and subsequent to being charged with clay, the molds are transported to other positions where the fabrication of the ware ensues.

The present application is particularly concerned with the matter of feeding clay to molds in the manufacture of a diversified production and to the control and regulation of charge size, bulk, volume and shape.

In the drawings,

Fig. 1 is an enlarged fragmentary view in side elevation of a portion of the mold conveying mechanism.

Fig. 2 is a vertical section of the clay feeder.

Fig. 5 is an elevation partly in section of a mold chuck and actuating mechanism therefor.

Fig. 6 is a detail view of a part of the mold elevating assembly of Fig. 5.

Fig. 7 is a reduced fragmentary view of a drive unit.

Fig. 8 is a horizontal section taken on the line 8—8 of Fig. 5.

Fig. 9 is a detail view in section of a detent.

Figures 3, 4:
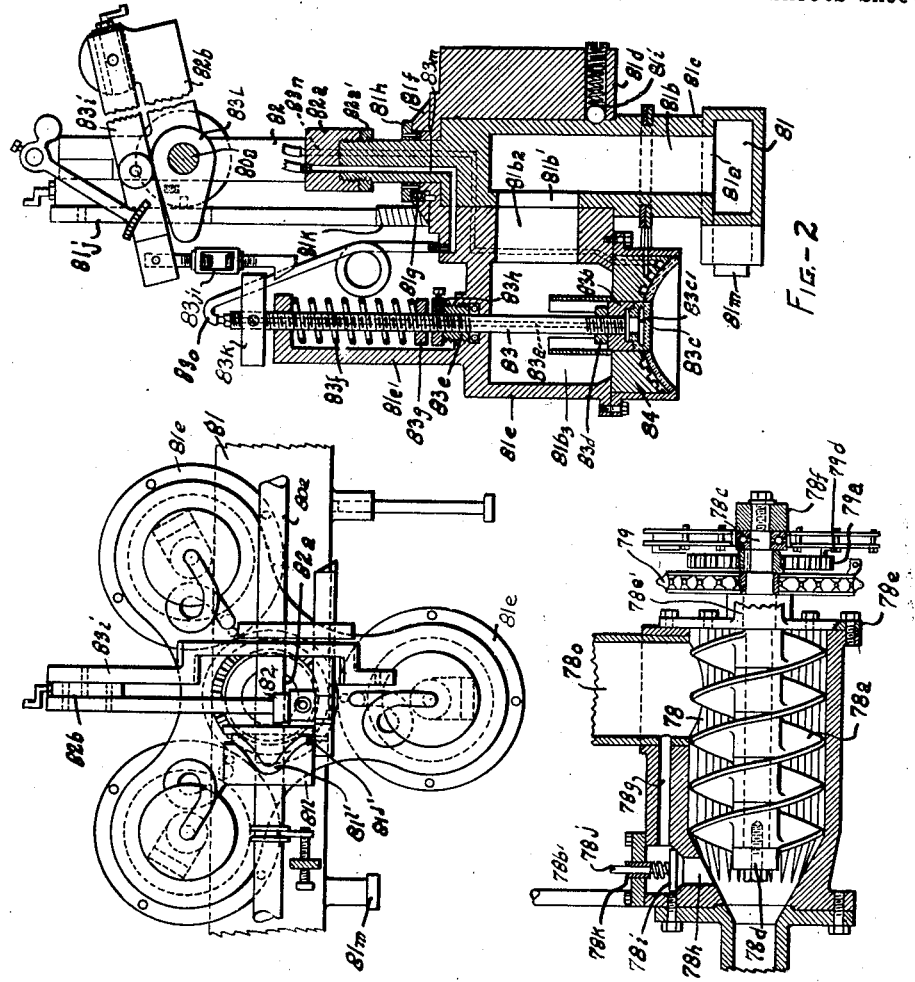
Fig. 3 is a top plan view of the apparatus of Fig. 2.
Fig. 4 is a sectional elevation of a pug mill used to supply clay to the feeder.

The molds in or on which the ware is fabricated are disposed in rows on open bottom trays or carriers 39, Fig. 1, which are swingably mounted in series in endless flexible chain conveyors 40 by hollow projecting trunnions 39a, having rollers 39b rotatably mounted thereon, these rollers having concave peripheries which assist in centering the trays laterally while supported on tracks 41. The rows extend longitudinally and transversely of the conveyer 39 and the molds M in any one row may be of the same or diverse character. For instance, molds for making identical production may comprise an endless row extending in the direction of length of the conveyer or the molds of a row extending laterally of the conveyer may be for an identical or a diversified production and the molds of the next succeeding row diversified with respect thereto. The object is to provide for correctly feeding clay to these many and diversified molds.

Tracks 41 are adjustably secured to the machine frame and support the trays moving in on one side and out on the other of the feeding apparatus. The trays 39 have mold supporting plates 39m mounted thereon in spaced alignment laterally of the conveyer and each support is adapted to carry a mold and the molds on succeeding supports in any one particular line, may be adopted for the production of ware of different size, shape or configuration.

The conveyer 40 is driven by sprockets and to provide for intermittently halting the trays at the feeding stations, a predetermined amount of slack is provided in the conveyer chain.

Track 41 is preferably formed with tray positioning notches where feeding operations requiring an inert tray ensues, and parallel with the track a tray carrying bar 47, notched at 46a, Fig. 1, is provided which is intermittently reciprocated by means of a system of rods and levers 47a, 47b, 47c, 47d and 47e, and the cam 47f and 47g, the rods 47a being pivotally secured at opposite extremities to the bar 47 and bell-crank levers 47b, the latter being pivotally connected by rod 47c which has pivotally connected thereto the one end of cam lever 47d, which is adapted to be actuated by cam 47g.

In operation, cam 47f, Fig. 1, actuates a lever 47c, bell-crank 47b and elevates bar 47 lifting the clay trunnions clear of the notches 46a; cam 47g then actuates lever 47e and the trays are advanced to the next succeeding notch. The chain sprockets (not shown) are driven in synchronism and the slack is periodically accumulated and dissipated on opposite sides of the halted tray or trays, the links buckling as shown at the left in Fig. 1 and permitting abutting trays to move into close-up relation.

Hollow or flat ware molds may be charged with clay and as the trays bearing the molds reach the feeding station said trays are halted with the molds superimposed relative to reciprocable and rotatable chucks 62 forming part of the mold actuating units, shown in Fig. 5, these chucks being located at the feeding station for the purpose of elevating the molds out of their open seats on the stands 39m into co-operation with the feeder. The complete assembly is mounted on a skeleton frame 63 adjustably secured on supports 63a. The frame 63 is provided with transversely aligned spindles 64, Fig. 6, having collars 64ª supporting a tapered thrust collar 64c, bearing rollers 64ca, saddle 64d and spring 64e abutting against cover 64f. The spindle moves upwardly against the tension of spring 64e and lowers by gravity.

Spindle 64 is a spline-sliding engagement with chuck spindle 62c, Fig. 5, on which chuck 62 is secured, reciprocation being imparted to chuck 62 and spindle 62c by cam 62d on cross shaft 63e. The cam operates lever 62f, which is adjustably pivoted at one extremity, the pivoting assembly being supported from the frame 63, and at its opposite extremity pivotally secured to a pitman 62g, the pitman connecting with spindle 62c by means of a cross fork 62h, which is adjustably secured to said pitman by nuts 62i at its one extremity and forked into an annular groove in the spindle 62c at its opposite extremity. The pitman 62g projects through and is guided by extensions 62j of the frame 63, the upper end of said pitman having adjustably threaded therein a contact screw 62k, the function of which will later become apparent.

Rotation may be imparted to spindle 64 in the unit shown in Fig. 5 by means of co-operative friction gears 64g and 64h, the gear 64g being adjustably secured on the spindle 64 and the gear 64h splined for longitudinal sliding movement on a continuously driven cross shaft 64i. The friction gears are brought into intermittent contact by lever and brake assembly comprising a brake shoe 64j formed with studs for mounting the shoe for vertical movement on the frame 63, a bell-crank lever 64k, connecting rod 64l, pitman 64n and cam contacting arms 64o and 64p. Arms 64o and 64p are alternately raised and lowered by individual cams, not shown, mounted on shaft 62e.

To vary the speed of rotation of the chuck during reciprocation, friction gears 64h have a grooved collar 64h' splined on shaft 64i, Fig. 7, and a grooved cam 64h² on shaft 62e, Fig. 8, motion being transmitted from the cam to the gear by a lever 64h³, the lever having a pin 64h⁴ working in the groove of cam 64h². At its lower extremity, the lever connects with the grooved hub 64h' through link 64h⁵.

In operation, the chuck reciprocating cam 62d and brake cams being adjusted to work in synchronism when the chuck spindle and chuck elevate, the brake 64j is released permitting spindle 64 to lower and thus lowering gear 64g into contact with the continuously rotating gear 64h and imparting rotation to the chuck. When the chuck is lowered, brake 64j uses and engages gear 64g, raising spindle 64 and disengaging gears 64g and 64h stopping rotation of the chuck.

The shafts 64i and 62e may be driven from the main drive shaft in the machine through, in each instance, helical gears 67a and 67, Fig. 7.

Super and sub-atmospheric pressure and other mediums may be applied to the molds through the chuck for various fabricating operations, the passages 62a and 62b extending down into the chuck spindle 62c and opening out into annular registering grooves 62a' and 62b' formed in a hood 70 having a working fit around the spindle and adjustably supported on the frame 63 by rod 70a, hose nipple 62a² and 62b² being threaded into the hood 70 and communicating with the grooves. A further communicating passage opening out in the bottom of the chuck is provided by bore 71, the interior of the spindle 62c being hollow, thus forming a chamber 71a, and the hood 70 having a further groove 71b both in communication with said chamber, a hose nipple 71c being threaded into the hood 70 and communicating with said groove. Where the passages 62a, 62b and 71 open out into the chuck 62, resilient sealing and cushioning pads are adjustably threaded into the chuck. The fluid is controlled by cam operated valves 72, described in the parent application.

The assembly just described is operated in conjunction with the feeder unit and may be mounted in multiple according to the number of fabricating lines being operated, the shafts 64i and 62e, Figs. 5 and 7, being common to all of the units if desired. The gears 64h are preferably disengaged and the chuck held against angular movement, since it is preferred not to rotate the chuck during feeding.

The clay of which the ware is to be formed is taken from the conditioning apparatus in the usual cartridge or slug form and disposed in a hopper 78o opening into a progressing and compacting chamber 78, Fig. 4, having a driven screw 78a working therein which progresses and compacts the clay into a conduit 81 extending transversely of the machine across the lines of molds and common to a multiple of feeders. From this conduit the clay is forced into extruding chambers and segregated and extruded into or on the molds by reciprocating plunger assemblies.

The chamber 78 is formed with a supporting bracket adapted for posts 78b' which are secured in one of the top plates of the machine and by means of which the entire feeder assembly may be adjustably supported over the mold-actuating assembly. The screw 78a is preferably formed in sections and the required number of these sections are assembled on the squared portion of a shaft 78c and secured from endwise displacement by an end cap 78d, said shaft having bearing in a detachable head 78e formed with a hub 78e' and bracket 78f, the bearing being provided with the usual packing gland and packing to ensure against leakage and wear.

The walls of the chamber 78 are preferably fluted longitudinally to prevent angular movement of the clay, and in the top wall a return passage 78g is formed, the inlet 78h of which is shaped to seat a valve 78i provided with a stem 78j having a sliding fit in an exteriorly-threaded sleeve 78k against the resistance of a spring 78l, said sleeve being adjustably threaded in a cover plate 78m, and the outlet of said passage opens into the hopper 78o. By adjusting sleeve 78k, the unseating pressure of valve 78 may be regulated to thereby regulate the operating pressure in the conduit 81. When the valve unseats, clay is permitted to pass through the return passage 78g back into the hopper 78o.

The screw 78a is preferably, but not necessarily, intermittently driven by a continuously-rotating sprocket gear 79, which is rotatably mounted on shaft 78c, and an intermittently rotating ratchet gear 79a.

In operation, the continuously-rotating gear 79 carries a pivotally-mounted dog 79d around the periphery of ratchet 79a, the dog being alternately thrown into and out of mesh with said ratchet by adjustable trip cams. Power for driving the screw 78a may be taken from the main drive of the machine which extends along the side of the machine, motion being transmitted from this shaft through various cross shafts, Fig. 7, for the fabricating units by means of helical gears 67 and 67a similar to those used for the shaft 44 and cross shafts 62e, Fig. 7.

Referring now to Fig. 2, the clay compacting in the conduit 81 is forced upwardly through openings 81a, formed in the top of the said conduit and into a chamber 81b formed in a pivot post 81c, and from the chamber 81b the clay passes through registering openings 81b' and 81b², respectively formed in the side wall of the post 81c and the hub of a pivoted turret casting 81d, and into one of a series of chambers 81b³ formed in a multiple of radial cylinders 81e forming part of the turret 81d, from which the clay is extruded into or on the molds. While the clay could be extruded direct from the conduit 81 onto the molds, the construction here shown is adapted for producing different kinds of ware in succession, as where plates, cups and saucers are being formed in one line of molds. The turret 81d, therefore, may be rotated on the pivot post 81c in synchronism with the mold conveyor to bring each cylinder over a mold as it is advanced in line if different types of molds are in the same line.

The upper extremity of the turret 81d is formed with a shoulder and trunnion to receive a gear 81f, which is rotatably mounted thereon, the gear being recessed to house a resiliently mounted latch or detent 81g, Fig. 9, the shoulder being formed with a number of recesses in accordance with the number of extruding cylinders 81b³, here three. After the gear and detent assembly have been applied, the gear is secured from displacement by a cap 81h. The side of the turret 81d is also bored to receive a spotting or positioning detent assembly 81i, Fig. 2, and the side wall of the pivot post 81c is formed with a plurality of notches, here three, so that when the turret is rotated to its approximate angular position, it is spotted by said detent.

The upper extremity of the pivot post 81c is threaded and thereon is adjustably mounted a lever-supporting bracket or post 82, the lower extremity of which is rounded and enlarged as at 82a, and threaded over the post 81c and secured by lock nut 82a', said bracket 82 also being cast with a branch bracket 82b. On the upper extremity of this bracket 82a lever 81j is adjustably pivoted, said lever 81j terminating to a gear segment 81k, which is in continual mesh with the turret gear 81f. The lever 81j is oscillated by a groove cam 81l, which is formed with a groove 81l' and adjustably secured as on shaft 80a, said lever being provided with a pin 81j' which engages in said groove.

As the cam 81l rotates, lever 81j is oscillated, thus oscillating turret gear 81f, the length of the stroke being adjusted in accordance with the angular spacing of the detent slots in the shoulder of the turret 81d. Thus, if the turret is to be intermittently rotated counter-clockwise, the detent is turned so that the toe of its beveled end faces in that direction, and if clockwise, the detent is simply turned in its socket accordingly, while if the turret is to be oscillated back and forth, the detent is turned to an intermediate position.

As the clay is progressed into the chambers 81b³, it is extruded therefrom in measured charges by reciprocating plungers, each of which comprises a stem 83, which is hollow or formed with a longitudinal bore 83a, the lower extremity of the plunger being threaded to adjustably receive a socket 83b, in which is threaded a porous head 83c composed of material such as plaster-of-Paris and having a chamber 83c' therein, the bore 83a terminating in said chamber. The head may be secured in adjusted position by a lock nut 83d. The stem 83 extends upwardly through the top of the cylinder 81e, which is provided with a packing gland 83e, said cylinder being formed with an extension guide bracket 81e' for said stem, the latter moving upwardly against the compression of a spring 83f, which encircles the stem 83 and is adjustable by a collar 83g threaded on said stem. A contact nut 83h is also adjustably threaded on the stem 83, to adjust the lowermost point of reciprocation or travel of the plunger.

The extruding plungers are forced upwardly against the compression tension of springs 83f by a lever 83i, adjustably pivoted at one extremity, Fig. 2, on the bracket 82b, and at its opposite extremity said lever has pivotally mounted thereon a hook 83j, adjustable by turnbuckle 83j', said hook engaging under a collar 83k, which is adjustably secured on each plunger stem 83. Lever 83i is actuated by a cam 83l, which is adjustably mounted on the shaft 80a, Fig. 3.

Means are provided for applying a treating medium, such as super and sub-atmosphere, electricity or other fluid to the clay charges, the rounded part 82a of bracket 82 and the upper extremity of post 81c being formed with registering bores or the passage 83m connecting with the plunger bore through a hose 83o and the passage 83n leading down through the turret and terminating in an exuding chamber in an upper die generally designated by the numeral 84. The passages 83m and 83n are under the control of a valve or valves such as that at 72, Fig. 5.

To provide for progressing different grades and mixtures of clay into one conduit and feeding a particular mix or grade into a particular advancing line or lines of molds, it is preferred to mount the progressing and compacting assembly shown at both ends of the conduit 81, and the extruding orifices along the conduit may be separated from one another by slide valves 81m. Thus, a certain grade or mix of clay may be progressed into each end of the conduit and maintained separate by the slide valves, or if it should be desired to feed a different grade or mix of clay to each line of molds, a separate feeding chute and screw could obviously be provided for each extruding assembly.

The feeder assembly as a whole is adapted for use with the mold actuating units described in connection with Fig. 5 and it will be seen that the charges of clay may be treated on all sides, viz: through the plunger head 83b, upper die or former and the mold.

The operation of the feeder should now be understood. The clay may be deposited in the hopper 78o in the usual cylindrical roll as it is taken from the conditioning apparatus, the screw 78a being intermittently actuated to progress and compact the clay in a homogeneous mass into the conduit 81, from which it is formed upwardly through the chamber 81b. If the turret is to be rotated to feed different types of molds in succession, the detent 81g is turned in the proper direction, and as the openings 81b' and 81b² register, the clay passes into the chamber 81b³, from which the feeding plungers eject or extrude and segregate it in measured charges against the molds, which are preferably elevated to the upper die and form a confining chamber substantially bounded on all sides by porous material and into which the clay is extruded, the descending plunger completing the walls of the chamber. The feeding plungers need only be raised to a point sufficient to permit approximately the correct quantity of clay to pass into the feeding orifices, the side walls of which form an accumulating chamber or well and at which time it is preferred to partially rotate the screw 78a, whereupon the descending plungers move into the orifices and eject the clay in the form of a column onto the molds with sufficient force to cause it to adhere thereto, the column spreading radially over the molds and expelling the air from the gradually closing chamber, until the molds and upper dies meet, at which time or shortly thereafter the charge is completely extruded by the descending plunger head.

In the event clay should tend to adhere to the plunger head, air under pressure may be applied to ensure release of the clay, or a suitable fluid or liquid applied so that the plaster head will be maintained in a moist and slippery condition, and in conjunction with the foregoing, sub-atmosphere or suction may be applied through the porous mold which will cause the clay to adhere thereto and also evacuate excess moisture and air pockets. By establishing a sub-atmospheric condition between the chuck and mold, the latter will be held firmly on the chuck and be prevented from sticking to the upper die if there should be any tendency in that direction. In the event it is desired to apply super-atmospheric pressure to the under-portion of the mold, the chuck may be magnetized.

Having thus described my invention, what I claim is:

1. In apparatus for the manufacture of pottery ware, a clay feeder which comprises, a plurality of charge forming mechanisms, means for alternating the charge forming mechanisms at the feeding position and means for locking said charge forming mechanisms in the feeding position.

2. Means for feeding clay to molds in the manufacture of pottery ware which comprises, a plurality of clay feeding mechanisms, means for automatically substituting one clay feeding mechanism for another in the feeding of clay to molds and means for locking the operating charge forming mechanism in the feeding position together with means for automatically unlocking and removing such feeder from the feeding position.

3. In combination with apparatus for transporting pottery ware molds, a clay feeder which comprises a plurality of charge forming mechanisms, means for automatically substituting charge forming mechanisms at the feeding position, each of said charge forming mechanisms being regulable to feed diverse charges and releasible means for locking the said charge forming mechanisms in the feeding position.

4. In a clay feeder, a plurality of orifice members, means for alternating the orifice members at the feeding position, means for locking said orifice member at the feeding position whilst feeding, the other orifice members being inoperative during such interval.

WILLIAM J. MILLER.